United States Patent
Waszak et al.

(10) Patent No.: US 12,246,677 B2
(45) Date of Patent: Mar. 11, 2025

(54) METHOD FOR OPENING AN OPENING PANEL OF A MOTOR VEHICLE BY MOTION DETECTION, USING A DOPPLER RADAR, AND ASSOCIATED DETECTION DEVICE

(71) Applicant: VITESCO TECHNOLOGIES GmbH, Regensburg (DE)

(72) Inventors: Wladia Waszak, Toulouse (FR); Franck D'Araujo, Toulouse (FR); Eric Servel, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 297 days.

(21) Appl. No.: 17/627,158

(22) PCT Filed: Jul. 7, 2020

(86) PCT No.: PCT/EP2020/069063
§ 371 (c)(1),
(2) Date: Jan. 14, 2022

(87) PCT Pub. No.: WO2021/008930
PCT Pub. Date: Jan. 21, 2021

(65) Prior Publication Data
US 2022/0250584 A1    Aug. 11, 2022

Related U.S. Application Data

(60) Provisional application No. 62/875,202, filed on Jul. 17, 2019.

(30) Foreign Application Priority Data

Sep. 12, 2019   (FR) ........................................ 1910041

(51) Int. Cl.
*B60R 25/30*   (2013.01)
*B60R 25/01*   (2013.01)
(Continued)

(52) U.S. Cl.
CPC .............. *B60R 25/30* (2013.01); *B60R 25/01* (2013.01); *E05F 15/73* (2015.01); *G01S 13/56* (2013.01);
(Continued)

(58) Field of Classification Search
None
See application file for complete search history.

(56) References Cited

U.S. PATENT DOCUMENTS 4,134,114 A * 1/1979 Riggs ........................ H03C 5/02
                                                         342/201
7,109,915 B2 * 9/2006 Kurodai .................... G01S 7/35
                                                         342/107
(Continued)

FOREIGN PATENT DOCUMENTS

CN    104060911 A    9/2014
CN    107806306 A    3/2018

OTHER PUBLICATIONS

Office Action issued in Chinese Patent Application No. 202080051307.8 dated Nov. 29, 2022.
(Continued)

*Primary Examiner* — Jelani A Smith
*Assistant Examiner* — Davin Seol
(74) *Attorney, Agent, or Firm* — NIXON & VANDERHYE

(57) ABSTRACT

Disclosed is a method for opening an opening element of a motor vehicle having a device detecting a predetermined movement of a user's body part, including a Doppler radar, including an antenna, radar waves transmitter/receiver and a radar wave processor. The method includes detection modes and standby modes with reduced wave frequency, the method including during standby: Phase demodulating the reflected radar waves and determining a first signal repre-
(Continued)

senting a phase variation of the reflected waves over time; Phase-shift demodulating the reflected radar waves, and determining a second signal representing phase variation of the reflected waves shifted as a function of time; Comparing threshold to maximum value of the absolute values for the first and second signals; Exiting the standby mode and triggering the detection mode if the maximum is greater than the predetermined threshold; Opening the opening element if the predetermined movement is detected during the detection mode.

12 Claims, 2 Drawing Sheets

(51) Int. Cl.
*E05F 15/73* (2015.01)
*G01S 13/56* (2006.01)
*G01S 13/931* (2020.01)
*B60R 25/20* (2013.01)

(52) U.S. Cl.
CPC ......... *G01S 13/931* (2013.01); *B60R 25/2054* (2013.01); *E05Y 2400/44* (2013.01); *E05Y 2400/45* (2013.01); *E05Y 2400/858* (2013.01); *E05Y 2900/548* (2013.01); *G01S 2013/93272* (2020.01)

(56) References Cited

U.S. PATENT DOCUMENTS

| | | |
|---|---|---|
| 2004/0196173 A1 | 10/2004 | Kuroda et al. |
| 2013/0065542 A1* | 3/2013 | Proudkii ............ H03H 11/1291 327/551 |
| 2014/0288784 A1 | 9/2014 | Van Wiemeersch et al. |
| 2016/0109568 A1* | 4/2016 | Aoyagi ................. G01S 13/878 342/59 |
| 2018/0170309 A1 | 6/2018 | Mcmahon et al. |
| 2018/0329049 A1 | 11/2018 | Amihood et al. |
| 2018/0329050 A1* | 11/2018 | Amihood .............. G06T 7/0012 |
| 2019/0126889 A1 | 5/2019 | Oman et al. |
| 2019/0162010 A1* | 5/2019 | Rafrafi ..................... B60J 5/101 |
| 2021/0181328 A1* | 6/2021 | Hayashi .................. G01S 13/86 |
| 2022/0295621 A1* | 9/2022 | De Jongh ............... G01S 13/88 |

OTHER PUBLICATIONS

International Search Report for PCT/EP2020/069063 mailed Sep. 25, 2020, 4 pages.

Written Opinion of the ISA for PCT/EP2020/069063 mailed Sep. 25, 2020, 6 pages.

* cited by examiner

METHOD FOR OPENING AN OPENING PANEL OF A MOTOR VEHICLE BY MOTION DETECTION, USING A DOPPLER RADAR, AND ASSOCIATED DETECTION DEVICE

CROSS-REFERENCE TO RELATED APPLICATIONS

This application is the U.S. national phase of International Application No. PCT/EP2020/069063 filed Jul. 7, 2020 which designated the U.S. and claims priority to U.S. Provisional Application No. 62/875,202 filed Jul. 17, 2019 and FR Patent Application No. 1910041 filed Sep. 12, 2019, the entire contents of each of which are hereby incorporated by reference.

BACKGROUND OF THE INVENTION

Field of the Invention

The invention relates to a method for opening/closing an opening element by detecting movement of a user's lower limb, using a Doppler radar, and allowing secure hands-free access.
Description of the Related Art The main but non-exclusive application of this invention relates to the opening of vehicle trunks, to allow the authorized user to open a trunk with only a foot movement, the user being identified by a fob or a key which they are bearing using a BCM (body control module) located in the vehicle.

Until now, hands-free access requests have mainly involved the need to position a hand to confirm a request to open/close a vehicle's opening element, and this process comprises two main steps: recognition of a key or a fob authorized to open or close the vehicle close to the opening via the BCM of the access system and, in the case of a request to open, detection of the hand's presence on a handle.

The implementation of this method requires antennas for the detection of authorized keys or fobs, presence sensors, generally capacitive sensors, in the handles for hand detection, and a centralized system for the management of hands-free access requests, which may, for example, be a computer fully or partially dedicated to this function.

Regarding the use of the foot for contactless opening, one known application relates to opening the door of an operating room for hospital staff. The utility model CN 202 143 044 proposes, for example, providing the door with an induction sensor for foot detection. People wishing to enter or exit the room extend their feet close to the sensor and the signal detected by the sensor is transmitted to a device for controlling a door opening/closing mechanism.

Use of the foot for hands-free access to the trunk of a car is presented in international application WO 2012/052210. This document proposes detection of movement of part of the user's body, for example the foot, via a capacitive detection assembly with two elongate electrodes. These electrodes extend horizontally under the trunk, the longest under the shortest, and are coupled to a control and evaluation device. Variations in capacitance are tracked with respect to a reference potential, and when the movement is within the detection range, activation is triggered, for example opening of the trunk.

However, the use of capacitive sensors has certain major drawbacks. Specifically, capacitive sensors are sensitive to external interference (rain, snow, etc.). The management of vehicle opening elements in the context of hands-free access requests with hand detection has been improved in order to counter various types of interference. For example, patent document FR 2 827 064 aims to identify the interference generated by the metallic paints of cars using a module for the logic-based interpretation of the durations of the received signals.

A solution to the problem of electromagnetic interference is described in patent document FR 2 915 331. It proposes temporal filtering of the signals from the sensors of the opening element handles, in order to validate or otherwise the presence of a hand on a handle before validating an opening request.

The hands-free opening/closing system in the current prior art therefore offers appreciable comfort for their users, with confirmation of the opening/closing of a given opening element via the presence of a hand or via a foot movement. However, false detections such as those resulting from interference caused by atmospheric phenomena, in particular rain, or of other types (electromagnetic interference, objects rolling under the bumper, etc.) are not identified and unexpectedly trigger a false opening request. Solutions exist to mitigate certain types of interference for opening/closing by hand, but no reliable solution exists for foot movement detection systems. Even though, in the latter case, the detection system is based on two sensors per opening element, the system is not sufficiently reliable in a noisy environment.

It is therefore known practice to use, instead of capacitive sensors, one or more Doppler radars. The detection of a predetermined movement of a lower limb of a user's body is achieved via the transmission of radar waves directed backwards from the vehicle (the radar may, for example, be located in the rear bumper of the vehicle) and via analysis of the waves reflected by the presence of the user. Analysis of the reflected waves allows dynamic determination of the movement: the user's distance from the radar, speed and form of the movement. Detection of the predetermined movement triggers the opening of the trunk.

However, a major drawback of Doppler radar is high power consumption, higher than that of capacitive sensors. It is therefore necessary to set standby modes for the radar, for example by reducing the scanning frequency.

In "detection" mode, the Doppler radar transmits, for example, a wave (or waves) with duration of about ten microseconds, every millisecond, for example 40 µs every 1 ms, i.e. a duty cycle of 4%. The consumption, during the detection mode, is then about 10 mA. This consumption is too high, and if the detection mode is continuously active, it risks draining the vehicle's battery. It is therefore known practice to set standby modes, during which the scanning frequency is reduced; for example, the radar transmits waves of about ten microseconds, every hundred milliseconds, for example 40 µs every 100 ms, i.e. a duty cycle of 0.04%.

With a reduced scanning frequency during the detection mode, the major risk is not being able to detect the user's predetermined movement in time.

The present invention therefore proposes a method for opening an opening element using a Doppler radar which makes it possible to overcome the drawbacks of the prior art. Specifically, the method for opening an opening element according to the invention allows the alternation of detection modes with standby modes while ensuring the detection of the user's predetermined movement.

SUMMARY OF THE INVENTION

The invention provides a method for opening an opening element of a motor vehicle, the vehicle being provided with a device for detecting a predetermined movement of a user's body part, comprising at least one Doppler radar, comprising an antenna, means for transmitting and receiving radar waves and means for processing reflected radar waves, suitable for detecting the predetermined movement, the method comprising detection modes having a transmission frequency and standby modes during which the transmission frequency of the waves is reduced, the method being noteworthy in that it comprises, during the standby modes, the following steps:

Phase demodulation of the reflected radar waves and determination of a first signal representing a phase variation of the reflected waves as a function of time, Phase-shift demodulation of the reflected radar waves, and determination of at least one second signal representing a phase variation of the reflected waves shifted as a function of time, Comparison between a predetermined threshold and a maximum value of the absolute values of the first signal and of the second signal, Exiting the standby mode and triggering the detection mode if the maximum is greater than the predetermined threshold, Opening the opening element if the predetermined movement is detected during the detection mode.

Advantageously, the phase-shift demodulation is a phase-quadrature demodulation with a shift by an angle of between 0° and 180°.

Preferably, the phase-shift demodulation is a phase-quadrature demodulation with a shift by an angle equal to 90°.

The invention also relates to a device for detecting a predetermined movement of a user's body part, intended to be installed on board a motor vehicle and comprising at least one Doppler radar, an antenna, means for transmitting and receiving radar waves, and means for processing reflected radar waves, suitable for detecting the predetermined movement, and said device being able to operate alternately in two modes, a detection mode having a transmission frequency and a standby mode during which the transmission frequency of the waves is reduced, said device being noteworthy in that it further comprises:

Means for phase demodulation of the reflected radar waves and for determining a first signal representing a phase variation of the reflected waves, Means for phase-shift demodulation of the reflected radar waves, and for determining at least one second signal representing a phase variation of the reflected waves shifted as a function of time, Means for comparing between a predetermined threshold and a maximum value of the absolute values of the first signal and of the second signal, Means for exiting the standby mode and triggering the detection mode depending on the above comparison;

Means for opening the opening element if the predetermined movement is detected during the detection mode.

Advantageously, the means for phase-shift demodulation are means for demodulation with a shift by an angle with a value of between 0° and 180°.

Preferably, the means for phase-shift demodulation are means for phase-quadrature demodulation, with a shift by an angle with a value equal to 90°.

The invention also relates to any motor vehicle comprising a device according to any one of the features given above.

BRIEF DESCRIPTION OF THE DRAWINGS

Other features and advantages of the invention will become more apparent from reading the following description. This is purely illustrative and should be read in conjunction with the appended drawings, in which.

DESCRIPTION OF THE PREFERRED EMBODIMENTS

Figure 1:
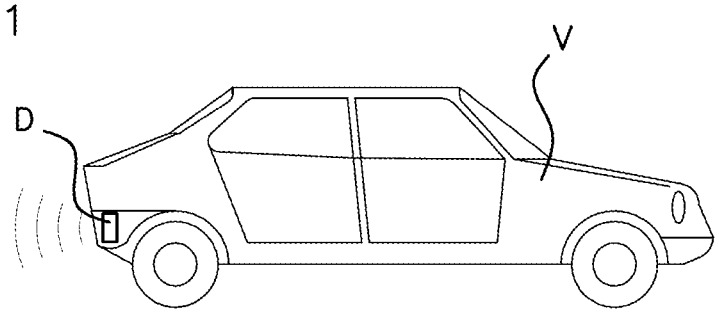
FIG. 1 schematically shows a vehicle provided with a device for detecting a predetermined movement of a user's body part comprising a Doppler radar, according to the invention, FIG. 2 schematically shows the detection device, and its electronic components, FIG. 3 schematically shows the means for transmitting and receiving radar waves, further comprising means for phase and phase-shift demodulation, according to the invention.

FIG. 1 shows a motor vehicle V, provided with a device D for detecting a predetermined movement of a user's body part, intended to trigger the opening of an opening element, specifically, in this example, the trunk of the vehicle V. Said device is included, preferably but in a non-limiting manner, in the rear bumper of the vehicle V. More particularly, said device comprises a Doppler radar, that is to say an antenna A, means for transmitting and receiving radar waves via the antenna A and means for processing the reflected radar waves in order to detect the predetermined movement.

The predetermined movement may consist of a "kick" or back and forth movement of a user's lower leg.

The processing of the radar waves reflected by the presence of the user's body makes it possible to determine whether said user has performed the predetermined movement and therefore whether they wish to open their vehicle's trunk. If the predetermined movement is detected, then the opening of the trunk is triggered; this is known to those skilled in the art and will not be further detailed here.

Figure 2:
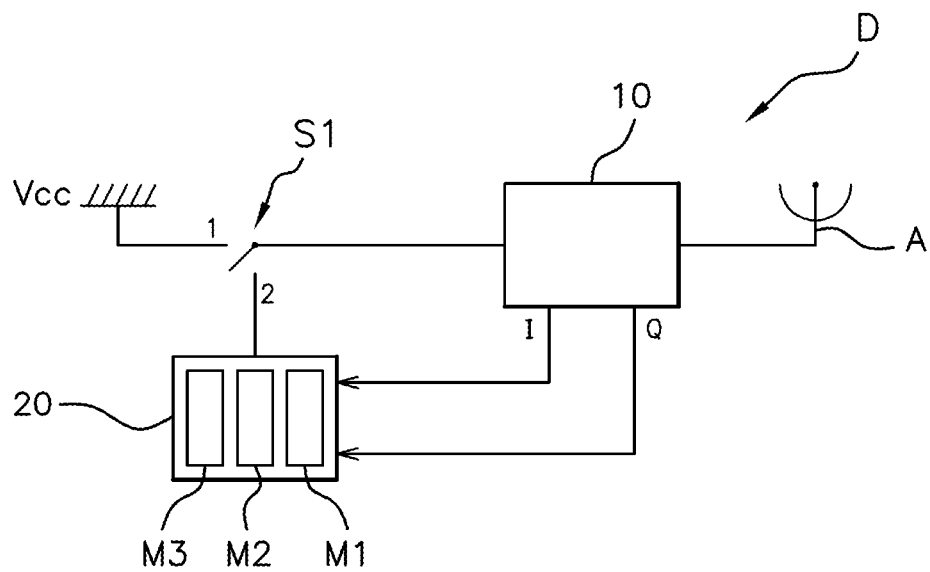

FIG. 2 shows the detection device D, which comprises an antenna A connected to transmission and reception means 10, themselves connected to a control unit 20. The control unit 20 and the transmission/reception means 10 are supplied with voltage Vcc, either directly or indirectly via the voltage from the battery of the vehicle V. Switching means S1 allow the transmission/reception means 10 to be supplied with power.

Figure 3:
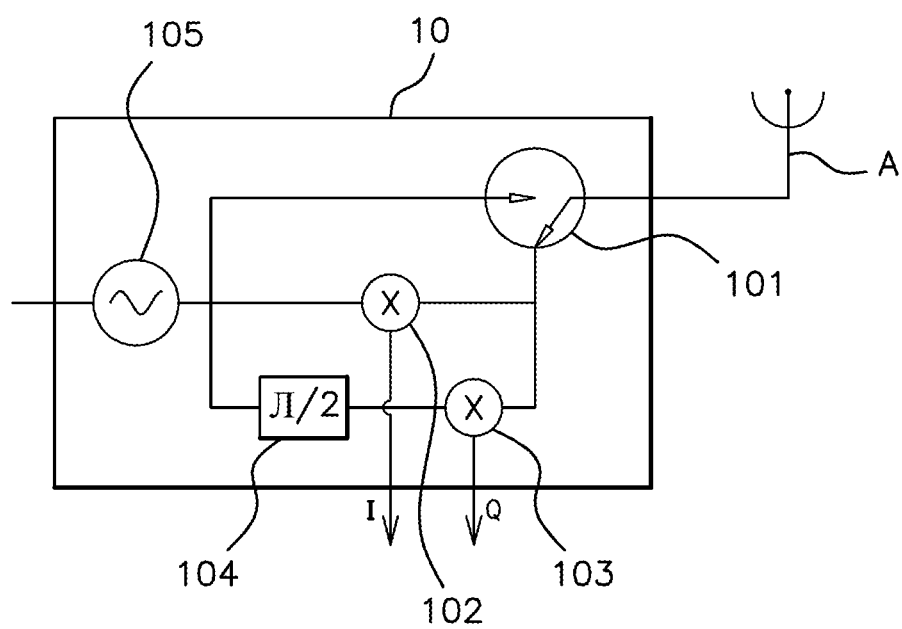

According to the invention, as illustrated in FIG. 3, the detection device D further comprises a directional coupler 101 connected to the antenna A; two demodulators connected to an output of the directional coupler, a first demodulator 102 suitable for delivering as output a first signal I representing the phase variations of the waves reflected and received by the antenna A, and a second demodulator 103 suitable for delivering as output a second signal Q representing the shifted phase variations of the waves reflected and received by the antenna A. For this, a phase shifter 104 is connected to the second demodulator 103. The directional coupler 101 allows the transmission/reception means 10 to operate in transmission and in reception. It also makes it possible to separate the transmission signal from the reception signal, that is to say the transmitted radar wave from the received radar wave. An output of the first demodulator 102 and an output of the phase shifter 104 are connected to an input of the directional coupler 101, and to an oscillator 105, generating the transmission signal intended for the antenna A.

The first signal I and the second signal Q are then delivered to the control unit 20 which analyzes said signals. The control unit 20 also comprises: means M1 for comparing between a predetermined threshold S and an absolute value of the maximum between the first signal I' and the second signal Q', means M2 for exiting the standby mode and for triggering the detection mode depending on the above comparison; and means M3 for opening the opening element if the predetermined movement is detected during the detection mode P1.

The comparison means M1, the means M2 for exiting the standby mode and triggering the detection mode, and the means M3 for opening the opening element are software means, integrated, for example, into a printed circuit of the control unit 20.

The control unit 20 and the transmission/reception means 10 are suitable for switching between two modes: a detection mode P1 having a high frequency of radar wave transmission, for example, a radar wave of about ten microseconds is sent every millisecond, and a standby mode P2, during which the frequency of radar wave transmission is reduced with respect to the detection mode, for example a radar wave of ten microseconds is sent every hundred milliseconds. The standby and detection modes have predetermined durations and/or settings. Once the wave has been sent, if a user is in proximity, the wave is reflected by the user's body and received by the antenna A and the transmission/reception means 10. The reflected wave is then analyzed by the control unit 20.

The invention proposes that when the detection device D is in standby mode, the reflected radar wave is phase-demodulated by the first demodulator 102 in order to produce as output the first signal I, but is also phase-shift-demodulated by the second demodulator 103 and the phase shifter 104 in order to produce the second signal Q. The first signal I and the second signal Q are then sent to the control unit 20 for processing according to the invention, as will be described later.

The phase shift is preferably, but in an entirely non-limiting manner, a shift by an angle with a value of 90° (or $\pi/2$) between the first signal I and the second signal Q. However, any other shift by an angle with a value of between 0° and 180° may be envisaged.

Figure 5:
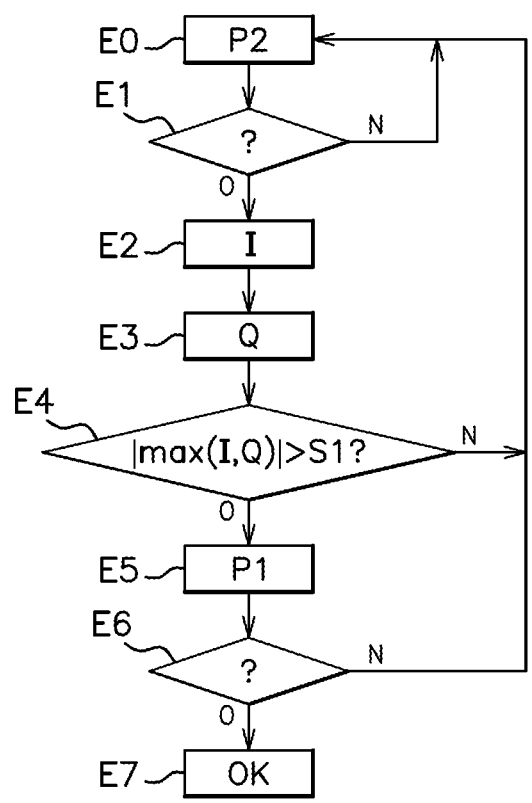
FIG. 5 is a flowchart showing the various steps of the method for opening the opening elements according to the invention.

The method for opening the opening elements of the vehicle according to the invention is illustrated in FIG. 5 and will now be described.

In a preliminary step E0, the detection device is in a standby mode P2, which is characterized by sending radar waves at a low or reduced transmission frequency with respect to the transmission frequency used in the detection mode. Radar waves are therefore transmitted by the device to the rear of the vehicle V.

If a user is located at the rear of the vehicle and in the region of radar wave propagation, then, during step E1, a reflected wave is received by the device via the antenna A, and the transmission/reception means 10, otherwise, if no reflected wave is received, then the method returns to the preceding step, and remains in the standby mode P2.

When radar waves are reflected (step E1), then the method according to the invention proposes a first, phase demodulation (step E2) of said reflected waves thus received in order to generate a first signal I representative of the phase of the waves. The first signal I is shown as a function of time on the graph illustrated in FIG. 4. The first signal I is a sinusoidal signal.

The method according to the invention proposes performing a second, phase-shift demodulation of said reflected waves thus received (step E3) in order to generate a second signal Q representative of a shifted phase of the waves; more precisely, the second signal is an image of the first signal shifted in time t. Preferably, but in a completely non-limiting manner, the phase shift is a shift by an angle with a value of 90°. The second signal Q is shown as a function of time t on the graph illustrated in FIG. 4; the second signal is therefore also a sinusoidal signal.

Figure 4:
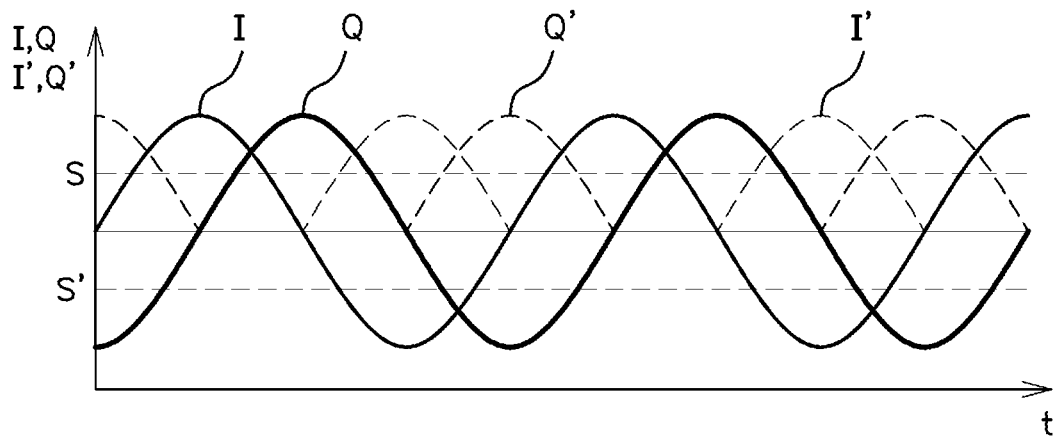
FIG. 4 shows the first signal representing a phase variation of the reflected waves, and the second signal representing a phase variation of the reflected waves shifted as a function of time t.

The invention then proposes, in step E4, comparing a maximum value of the absolute values of the first signal I and of the second signal Q with a predetermined threshold S. Specifically, the two signals are centered on zero. By taking their absolute value, the first signal I and the second signal Q then have only positive values. FIG. 4 illustrates with dashed lines the first signal I' and the second signal Q' in terms of absolute value for the values of the first signal I and of the second signal Q which are originally negative.

The method according to the invention then proposes comparing, at each time t, the maximum value of the signals in terms of absolute value I', Q' with a threshold S. If the maximum of the absolute values of the first signal I or of the second signal Q exceeds the predetermined threshold S (step E4), then the detection device comes out of the standby mode and goes into the detection mode P1, during step E5, with a higher transmission frequency, in order to detect the predetermined movement of a user's body part quickly and in time.

If the predetermined movement was detected during the detection mode (step E6), the trunk is then opened, otherwise, if no predetermined movement was detected during the detection mode P1, for example for a predetermined duration, then the method returns to step E0, and the detection device returns to standby mode P2.

The invention therefore makes it possible, during the standby mode, to quickly detect the presence of a user at the rear of the vehicle in order to engage the detection mode and to detect the predetermined movement in time in order to open the trunk.

The invention claimed is:

1. A method for opening an opening element of a motor vehicle provided with a detection device configured to detect a predetermined movement of a body part of a user, the detection device including at least one Doppler radar including an antenna, a transmission/reception device configured to transmit and receive radar waves, and a processor configured to process reflected radar waves, the method comprising:
alternating between
i) detection modes of transmitting the radar waves at a first transmission frequency during which transmission of the radar waves at a second transmission frequency is inactive, the second transmission frequency being less than the first transmission frequency, and
ii) standby modes of transmitting the radar waves at the second transmission frequency during which transmission of the radar waves at the first frequency is inactive, during the standby modes of transmitting the radar waves at the second transmission frequency during which transmission of the radar waves at the first frequency is inactive:
  phase demodulating the reflected radar waves by a first demodulator and determining a first signal that is an I signal, representing a phase variation of the reflected waves as a function of time, an output of the first demodulator being connected to an input of a directional coupler that separates the transmitted radar waves from the received radar waves,
  phase-shift demodulating the reflected radar waves by a second demodulator and a phase shifter connected to the second demodulator, and determining a second signal that is a Q signal, representing a phase variation of the reflected waves shifted as a function of time, an output of the phase shifter being connected to the input of the directional coupler and to an oscillator that generates the transmitted radar waves,
  comparing a predetermined threshold to a maximum value among absolute values of the I signal and absolute values of the Q signal,
  while in a standby mode, upon determining that a maximum of the absolute values of the I signal or the absolute values of the Q signal is greater than the predetermined threshold, exiting the standby mode and triggering a detection mode of transmitting the radar waves at the first transmission frequency during which transmission of the radar waves at the second transmission frequency is inactive, and
  while in the detection mode of transmitting the radar waves at the first transmission frequency during which transmission of the radar waves at the second transmission frequency is inactive, opening the opening element when the predetermined movement is detected during the detection mode.

2. The opening method as claimed in claim 1, wherein the phase-shift demodulation is a demodulation with a shift by an angle of between 0° and 180°.

3. The opening method as claimed in claim 1, wherein the phase-shift demodulation is a phase-quadrature demodulation with a shift by an angle equal to 90°.

4. A device for detecting a predetermined movement of a body part of a user, the device being configured to be installed on board a motor vehicle, the device being configured to operate in two modes including detection modes having a first transmission frequency and standby modes having a second transmission frequency, the second transmission frequency being less than the first transmission frequency, the device comprising:
  at least one Doppler radar comprising an antenna;
  a transmission/reception device configured to transmit and receive radar waves;
  one more processors configured to process reflected radar waves;
  an oscillator generating the transmitted radar waves;
  a directional coupler that separates the transmitted radar waves from the received radar waves;
  a first demodulator configured to phase demodulate the reflected radar waves, the one or more processors being configured to determine a first signal that is an I signal, representing a phase variation of the reflected waves, the first demodulator having an output connected to an input of the directional coupler; and
  a second demodulator and a phase shifter connected to the second demodulator, the second demodulator and the phase shifter being configured to phase-shift demodulate the reflected radar waves, a second signal that is a Q signal, representing a phase variation of the reflected waves shifted as a function of time, being determined by the one or more processors, an output of the phase shifter being connected to the input of the directional coupler and to an oscillator that generates the transmitted radar waves,
wherein the one or more processors are configured to:
  compare a predetermined threshold and a maximum value among absolute values of the I signal and of the Q signal,
  exit one of the standby modes and trigger one of the detection modes when the comparing finds a maximum of the absolute values of the I signal or of the Q signal exceeds the predetermined threshold, and
  open the opening element when the predetermined movement is detected during the detection mode,
wherein the device is configured to alternate between
i) the detection modes of transmitting the radar waves at a first transmission frequency during which transmission of the radar waves at a second transmission frequency is inactive, and
ii) the standby modes of transmitting the radar waves at the second transmission frequency during which transmission of the radar waves at the first frequency is inactive.

5. The device as claimed in claim 4, wherein the phase-shift demodulator performs phase-quadrature demodulation, with a shift by an angle with a value of between 0° and 180°.

6. The device as claimed in claim 4, wherein the phase-shift demodulator performs, with a shift by an angle with a value equal to 90°.

7. The motor vehicle comprising the device of claim 4.

8. The opening method as claimed in claim 2, wherein the phase-shift demodulation is a phase-quadrature demodulation with a shift by an angle equal to 90°.

9. The device as claimed in claim 5, wherein the phase-shift demodulator performs, with a shift by an angle with a value equal to 90°.

10. The motor vehicle comprising the device of claim 5.
11. The motor vehicle comprising the device of claim 6.
12. The motor vehicle comprising the device of claim 9.

* * * * *